Oct. 25, 1960
W. E. RUDISCH
2,957,562
CLUTCHES
Filed April 25, 1958
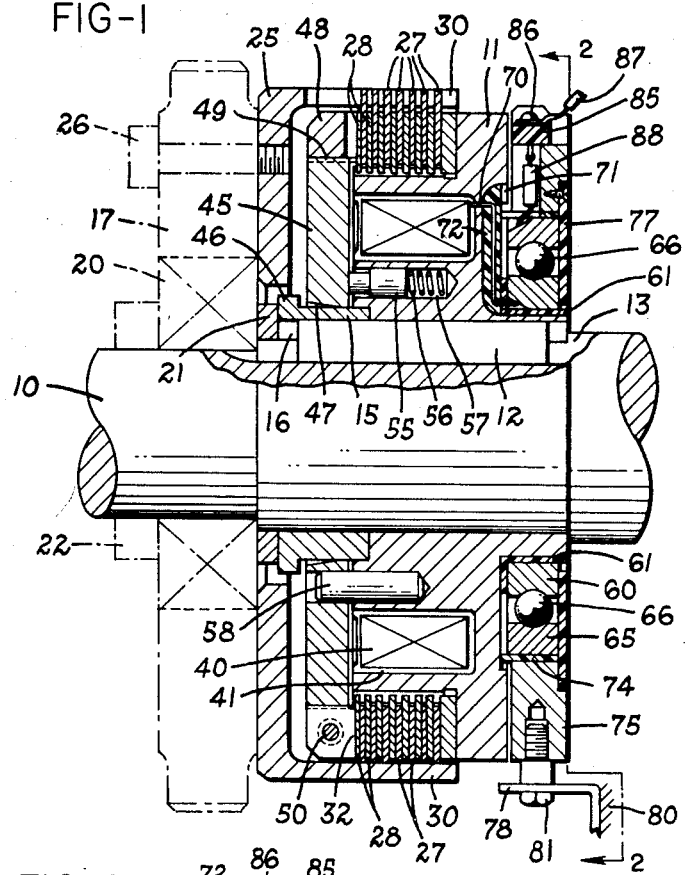
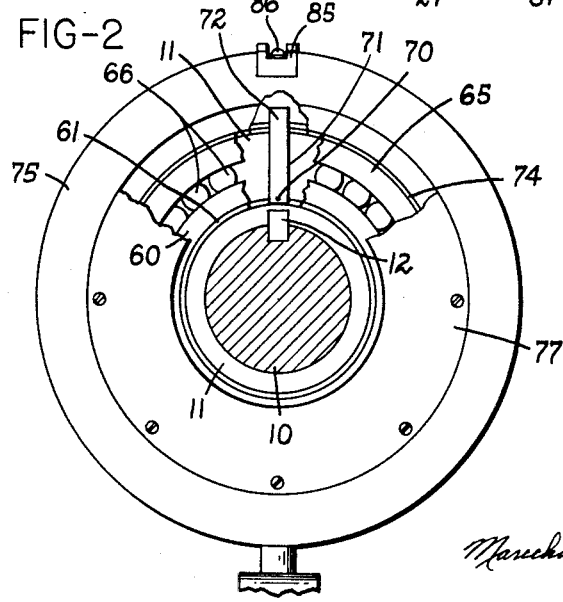
INVENTOR.
WALTER E. RUDISCH
BY
Marechal, Biebel, French & Bugg
ATTORNEYS United States Patent Office 2,957,562
Patented Oct. 25, 1960

2,957,562

CLUTCHES

Walter E. Rudisch, Dayton, Ohio, assignor, by mesne assignments, to The Bendix Corporation, a corporation of Delaware Filed Apr. 25, 1958, Ser. No. 730,840

3 Claims. (Cl. 192—84)

This invention relates to clutches and more particularly to an electromagnetic clutch having an anti-friction connection for transmitting electrical energy to a rotating coil from a stationary source.

Clutches in which the operating parts are releasably joined through use of an electromagnetic field set up by a rotating coil require suitable connections for enabling the transmision of electrical energy from a stationary source into the rotating coil. A common way of providing the connection is to direct the electricity into stationary carbon brushes which ride on the surface of a collecting ring carried by a rotating part of the clutch. While this type of connection is widely used and is acceptable in many situations, it can require frequent inspection and replacement of the brushes, which are often difficult to effect when the clutch is not easily accessible. For example, many machine tools such as milling machines, broaching apparatus, planers, and so forth, may use a number of relatively small clutches which are operated remotely and are inaccessible for purposes of economical inspection and repair.

It is therefore a principal object of this invention to provide an electromagnetic clutch including improved rotatable electrically conducting elements between a rotating member for creating an electromagnetic field to operate the clutch and a source of current for energizing the rotating member.

It is another object of this invention to provide an electromagnetic clutch having an electrically conductive anti-friction connection including a rotatable race joined to the driving body, a complementary race connected to a stationary terminal piece, and rotatable anti-friction elements contained between the races to transmit electricity from one to the other.

Other objects and advantages of this invention will be apparent from the following description, the accompanying drawing and the appended claims.

In the drawing—

Fig. 1 is a section through a clutch embodying an anti-friction, current transmitting connection according to the present invention; and Fig. 2 is a view taken substantially along the line 2—2 of Fig. 1 with parts broken away to show the manner in which the anti-friction connection is mounted.

Referring to Fig. 1 of the drawing, which illustrates a preferred embodiment of the present invention as adapted for use with a friction disk-type electromagnetic clutch, the driving shaft 10 extends from a suitable rotating source of power and has an inner or main clutch body 11 attached to it by a key 12 mounted within keyway 13. Shaft 10 also carries spacer sleeve 15, which is slotted at 16 to receive key 12, and a driven body 17. The body 17 is shown as a gear which rides on a bearing 20, the bearing being retained in proper position on the shaft 10 by a bushing 21 adjacent the outer end of spaced sleeve 15 and a retaining ring 22 located on the opposite side of bearing 20.

The main clutch body 11 acts as the driving body and cooperates with an outer or second clutch body or spider 25 which can be attached to the driven body 17, as by means of bolts 26, to effect rotation thereof. Cooperating engagement of body 11 with spider 25 is accomplished through a frictional connection made up of a plurality of interengaging friction disks 27 and 28 arranged in the usual alternating relation, specifically, the outer disks 27 have the usual notches in their outer peripheries which receive the finger portions 30 of the spider 25, so that while longitudinal movement of the disks may take place, no rotary movement can occur, and the disks 28 are similarly permitted longitudinal movement and prevented from rotary movement by notching their inner peripheries to fit key-like extensions 32 on body 11.

Longitudinal movement of the disks 27 and 30 is required to enable the disk stack to be compressed and expanded to make and break the driving connection between body 11 and spider 25 when desired. Compression of the disk stack is effected by means of an electromagnetic field created by a coil 40 positioned within the recess 41 in body 11. The field, when present, acts to draw an armature 45 toward the coil and compress the disk stack, thus operably connecting body 11 and spider 25. The armature is mounted for axial movement on spacer sleeve 15 between the flanged end 46 and the inner surface of body 11 and has its inner peripheral surface beveled to form tapered surface 47 preventing binding of the armature during movement.

The outer peripheral surface of armature 45 carries a split pressure-adjusting ring 48 having a threaded connection thereto, indicated generally at 49. The axial position of the ring 48 relative to the disk stack can be varied by loosening the screw 50, which normally holds the ring against movement, and turning the ring 48 to the desired location. In this manner compensation can be made for disk wear, and the like, which might otherwise reduce the efficiency of the connection by permitting slippage between the disks.

During periods when the clutch is deenergized, a small, piston-like plunger 55 transmits the pressure of a biasing spring 56 against the armature, moving it to a non-operating position against flange 46 and relieving the disk stack of any compressing pressure. Plunger 55 and spring 56 are both located in the opening 57 which extends into the body 11 from the side wall adjacent armature 45. A dowel pin 58 is secured within body 11 and received into an opening in the armature 45 to make certain that the two parts rotate at the same speed and eliminate any possible rubbing friction between adjusting ring 48 and the adjacent disk 30.

The present structure for transmitting current to the coil 40 to create an electromagnetic field and compress the disk stack differs materially from the carbon brushes normally used, for example, in that rotatable anti-friction elements in the form of an anti-friction bearing are used to transmit the current between a stationary current supplying terminal and the rotating coil 40. Referring to Fig. 1, main body 11 has an outwardly extending shoulder which receives an inner race 60. The race is insulated from the shoulder by a plastic liner or insert 61, and the liner 61 and race 60 are so dimensioned that the race can be force fitted onto the body 11 and remain in proper operating relationship. Surrounding the race 60 is an outer, complementary race 65 which cooperates with the inner race 60 to contain rotatable anti-friction elements shown as balls 66.

The inner race 60 is electrically connected to one terminal of the coil 40 by a wire 70 which extends outwardly from the race 60 through a recess 71 formed in the wall of body 11 and finally into connection with the coil. The recess 71 may be filled with a suitable plastic material 72 to keep wire 70 in relatively fixed position and prevent any rubbing or chafing which might wear away the insulation and perhaps break the connection between the race and the coil. The other terminal of the coil may be connected in the usual way to the body 11 and thereby to ground by way of the shaft 10.

The outer race 65 is supported as by press fitting with the aid of an insulating gasket 74 in a terminal ring 75, and the ring 75 is shown as provided with an annular cover plate 77 of low frictional characteristics for sealing the bearing 65—66 against dirt or the like. The terminal ring 75 is shown as held against rotational movement by an angle bracket 78 mounted at 80 on any stationary member such as the housing for a transmission or the like in which the clutch may be used, and a screw 81 secures the bracket 80 to the ring 75.

The terminal ring 75 carries a terminal block 85 for the terminal 86 which is connected by a line 87 to a suitable source of electrical energy, and a line 88 leads from the terminal 86 and is soldered or otherwise directly connected to the outer race 65. Accordingly, when the energizing current is applied to the line 87, it is transmitted directly to the outer race 65 and thence by way of the balls 66 to the inner race 60 and the line 70 leading to one end of the coil 40, the other end of the coil being grounded as previously explained.

It will accordingly be seen that this clutch construction offers substantial advantages over conventional arrangements requiring brush connections and a wiper ring. Not only is this construction considerably simpler, but also it eliminates virtually all possibility of wear since the balls 66 are not required to carry any appreciable mechanical load. For this reason, the balls 66 may be of a metal such as bronze of high current carrying capacity, and at the same time maintenance of the electrical portions of the clutch is reduced to a minimum.

While the form of apparatus herein described constitutes a preferred embodiment of the invention, it is to be understood that this invention is not limited to this precise form of apparatus and that changes may be made therein without departing from the scope of the invention which is defined in the appended claims.

What is claimed is:

1. An electromagnetic clutch comprising a main clutch body, an electromagnetic coil carried by said body, a driven clutch member, bearing means supporting said body and said driven member for relative rotation, means including an armature responsive to energizing of said coil for effecting connection between said driven clutch member and said main clutch body, said main body having an annular extension thereon, an anti-friction electrical connector associated with said main body and including inner and outer races and a plurality of anti-friction elements supported between said races in rolling contact therewith, means forming a fixed and electrically insulated connection for said inner race on said main body extension, means electrically connecting said inner race to said coil, said anti-friction elements forming a continuous electrical connection between said races, and means for connecting said outer race directly to a stationary source of energizing current.

2. A clutch as defined in claim 1 including cover means enclosing said races and said anti-friction conducting elements to maintain a clean substantially enclosed electrical connection therebetween free from interference of dirt and the like.

3. In an electromagnetic clutch for forming a releasable connection between a rotating driving shaft and a member driven thereby, the combination of a first driving clutch body attachable to the driving shaft for rotation therewith, a second driven clutch body relatively rotatable with respect to said first body and mounted for driving engagement therewith, bearing means rotatably supporting said second body, means providing a drive connection between said second body and the driven member, releasable clutch means including a control armature for forming a releasable drive connection between said bodies, an electromagnetic coil carried by said first body and rotatable therewith, said coil being operable to create an electromagnetic field controlling said armature to engage and disengage said releasable connection, an anti-friction electrical power supply connection for said coil including complementary electrically conductive races and a plurality of electrically conductive elements in rolling contact therebetween, means mounting one of said races for rotation with said first body, means connecting said one race to said coil providing for supply of electrical power thereto, means providing a separate mounting for the other said race including electrically insulating and covering means isolating said races from the atmosphere to maintain a clean electrically conductive path therebetween, said covering means including a low friction rotary seal extending across said races, and terminal means passing through said mounting means and connected to said other race for connection to a supply of electrical power.

References Cited in the file of this patent

UNITED STATES PATENTS

| Re. 19,150 | Furnas | May 1, 1934 |
|---|---|---|
| 1,760,174 | Schunemann | May 27, 1930 |
| 1,787,225 | Wittkuhns | Dec. 30, 1930 |
| 1,999,303 | Sarbey | Apr. 30, 1935 |
| 2,057,876 | Berry | Oct. 20, 1936 |
| 2,068,189 | Mead | Jan. 19, 1937 |
| 2,328,212 | Heiner | Aug. 31, 1943 |
| 2,409,600 | Trautschold | Oct. 15, 1946 |
| 2,494,244 | Jonard et al. | Jan. 10, 1950 |
| 2,502,252 | Faile | Mar. 28, 1950 |

FOREIGN PATENTS

| M19,068 | Germany | June 28, 1956 |